(12) United States Patent
Ward (10) Patent No.: US 12,361,727 B2
(45) Date of Patent: Jul. 15, 2025

(54) MIRROR ASSEMBLY WITH DRIVER MODELING SYSTEM

(71) Applicant: GENTEX CORPORATION, Zeeland, MI (US)

(72) Inventor: Mark E. Ward, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 95 days.

(21) Appl. No.: 18/340,066

(22) Filed: Jun. 23, 2023

(65) Prior Publication Data

US 2023/0419691 A1    Dec. 28, 2023

Related U.S. Application Data

(60) Provisional application No. 63/355,297, filed on Jun. 24, 2022.

(51) Int. Cl.

| | |
|---|---|
| *G06T 7/73* | (2017.01) |
| *B60R 1/12* | (2006.01) |
| *G06T 7/60* | (2017.01) |
| *G06V 20/59* | (2022.01) |
| *B60Q 9/00* | (2006.01) |
| *B60R 1/04* | (2006.01) |
| *B60R 21/015* | (2006.01) |

(52) U.S. Cl.
CPC ............ *G06V 20/597* (2022.01); *B60R 1/12* (2013.01); *G06T 7/60* (2013.01); *G06T 7/73* (2017.01); *B60Q 9/00* (2013.01); *B60R 1/04* (2013.01); *B60R 2001/1215* (2013.01); *B60R 2001/1253* (2013.01); *B60R 21/01512* (2014.10); *G06T 2207/30196* (2013.01); *G06T 2207/30268* (2013.01)

(58) Field of Classification Search
CPC ... G06T 7/73; G06T 7/60; G06T 2207/30196; G06V 20/597
See application file for complete search history.

(56) References Cited

U.S. PATENT DOCUMENTS

| | | | |
|---|---|---|---|
| 6,389,340 B1 * | 5/2002 | Rayner | ........... G07C 5/085 348/148 |
| 8,264,761 B2 | 9/2012 | Cammenga et al. | |
| 8,643,931 B2 | 2/2014 | Cammenga et al. | |
| 8,646,924 B2 | 2/2014 | Roth et al. | |
| 8,814,373 B2 | 8/2014 | Steel et al. | |

(Continued)

FOREIGN PATENT DOCUMENTS

| | | |
|---|---|---|
| CN | 111703393 A | 9/2020 |
| EP | 2393691 B1 | 5/2014 |
| JP | 2006163900 A | 6/2006 |

*Primary Examiner* — Zhubing Ren
(74) *Attorney, Agent, or Firm* — Price Heneveld LLP; Brian James Brewer (57) ABSTRACT

A mirror assembly with a driver modeling system includes a camera unit for capturing image data, a user interface, a processor, and a memory. The memory includes instructions that, when executed by the processor, cause the processor to request from a driver on the user interface or extrapolate from the image data at least one physical characteristic. In response to receiving or extrapolating the at least one physical characteristic, assigning one out of a plurality of model profiles of a driver's head based on the at least one physical characteristic.

20 Claims, 4 Drawing Sheets

(56) References Cited

U.S. PATENT DOCUMENTS

| | | |
|---|---|---|
| 8,885,240 B2 | 11/2014 | Roth et al. |
| 9,460,342 B1 | 10/2016 | Freund et al. |
| 10,616,218 B2 | 4/2020 | Boehm |
| 2010/0201896 A1* | 8/2010 | Ostreko .................... B60R 1/12 349/1 |
| 2018/0097804 A1* | 4/2018 | Boehm ................ G06Q 20/145 |
| 2018/0113454 A1* | 4/2018 | Emura .................. B60W 50/14 |
| 2019/0147263 A1 | 5/2019 | Kuehnle et al. |
| 2019/0156150 A1* | 5/2019 | Krishnan ............... G06V 40/70 |

\* cited by examiner

MIRROR ASSEMBLY WITH DRIVER MODELING SYSTEM

CROSS-REFERENCE TO RELATED APPLICATION

This application claims priority to and the benefit under 35 U.S.C. § 119(e) of U.S. Provisional Application No. 63/355,297, filed on Jun. 24, 2022, entitled "MIRROR ASSEMBLY WITH DRIVER MODELING SYSTEM," the disclosure of which is hereby incorporated herein by reference in its entirety.

BACKGROUND OF THE DISCLOSURE

The present disclosure generally relates to a rearview device system, and, more particularly, to a mirror assembly with a driver modeling system that accurately obtains driver size and positioning information.

SUMMARY OF THE DISCLOSURE

According to one aspect of the present disclosure, a mirror assembly with a driver modeling system for a vehicle is provided. The driver modeling system comprises a camera unit for capturing image data, a user interface, a processor, and a memory. The memory includes instructions that, when executed by the processor, cause the processor to request from a driver on the user interface or extrapolate from the image data at least one physical characteristic. In response to receiving or extrapolating the at least one physical characteristic, assigning one out of a plurality of model profiles of a driver's head based on the at least one physical characteristic.

According to another aspect of the present disclosure, a mirror assembly with a driver modeling system for a vehicle is provided. The driver modeling system comprises a camera unit for capturing image data, a user interface, a processor, and a memory. The memory includes instructions that, when executed by the processor, cause the processor to request, from a driver, at least one physical characteristic via the user interface and, in response to receiving the at least one physical characteristic, assign one out of a plurality of model profiles of a driver's head based on the at least one physical characteristic. The processor is further configured to, in response to not receiving the at least one physical characteristic after a predetermined amount of time, extrapolate a size of the driver's head from the image data and assigning an extrapolated model profile.

According to yet another aspect of the present disclosure, a mirror assembly with a driver modeling system for a vehicle is provided. The driver modeling system comprises a camera unit for capturing image data, a user interface, a processor, and a memory. The memory includes instructions that, when executed by the processor, cause the processor to request, from a driver, at least one physical characteristic via the user interface and, in response to receiving the at least one physical characteristic, assign one out of a plurality of model profiles of a driver's head based on the at least one physical characteristic. The processor is further configured to obtain a relative position between the camera unit and the vehicle and obtain a relative position between the camera unit and the driver. In response to receiving the relative positions, the processor is further configured to coordinate transform the relative positions to obtain a driver location relative to the vehicle. The processor is further configured to monitor the relative position between the driver and the vehicle with the assigned model profile and generate a notification upon a mannerism coinciding with dangerous operational behaviors.

These and other features, advantages, and objects of the present disclosure will be further understood and appreciated by those skilled in the art by reference to the following specification, claims, and appended drawings.

DETAILED DESCRIPTION

The present illustrated embodiments reside primarily in combinations of method steps and apparatus components related to a mirror assembly with a driver modeling system that accurately obtains driver size and positioning information. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
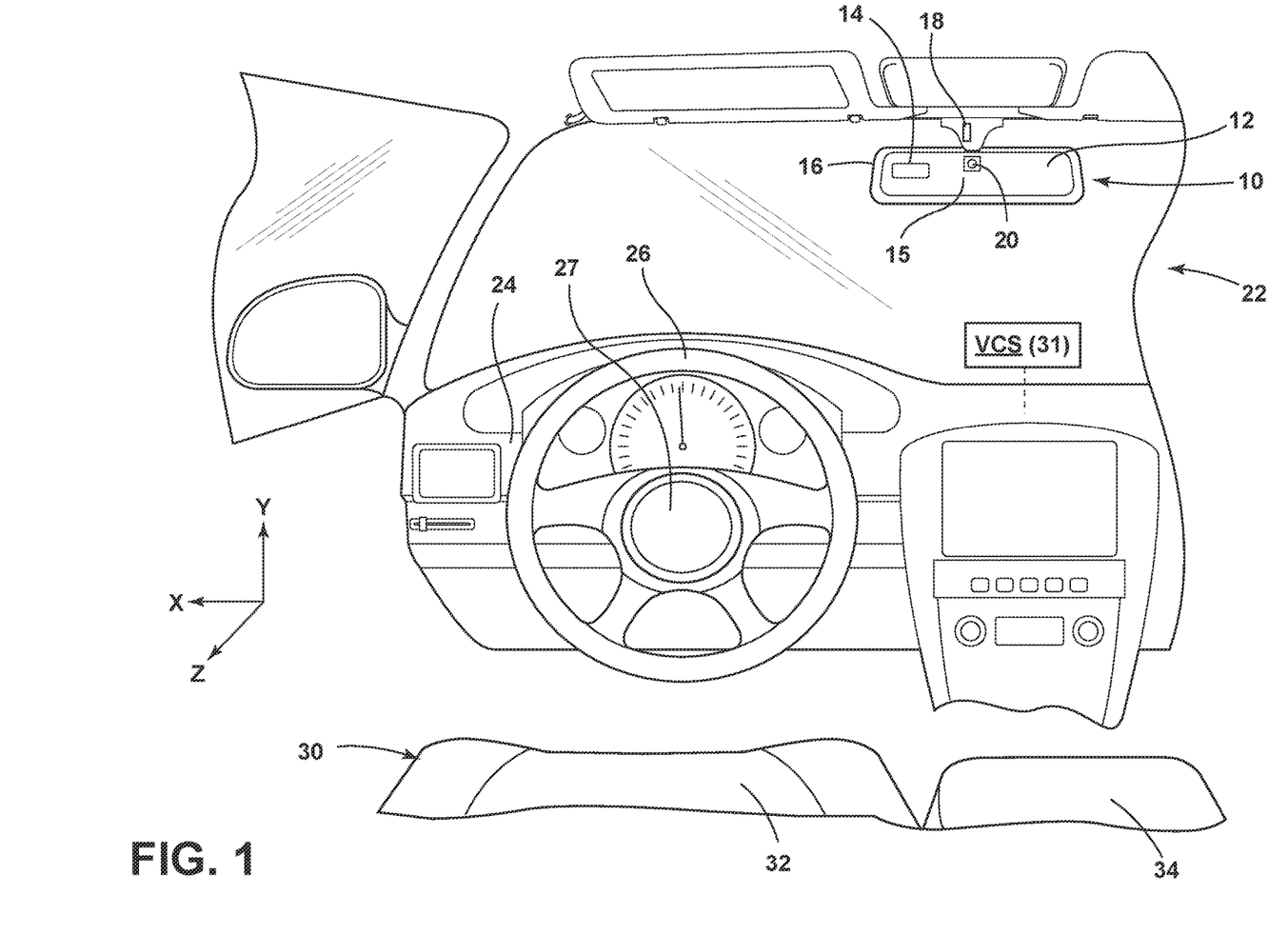
FIG. 1 is an interior perspective view of a cabin in a vehicle with a mirror assembly, according to the present disclosure.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer of the display mirror, and the term "rear" shall refer to the surface of the element further from the intended viewer of the display mirror. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
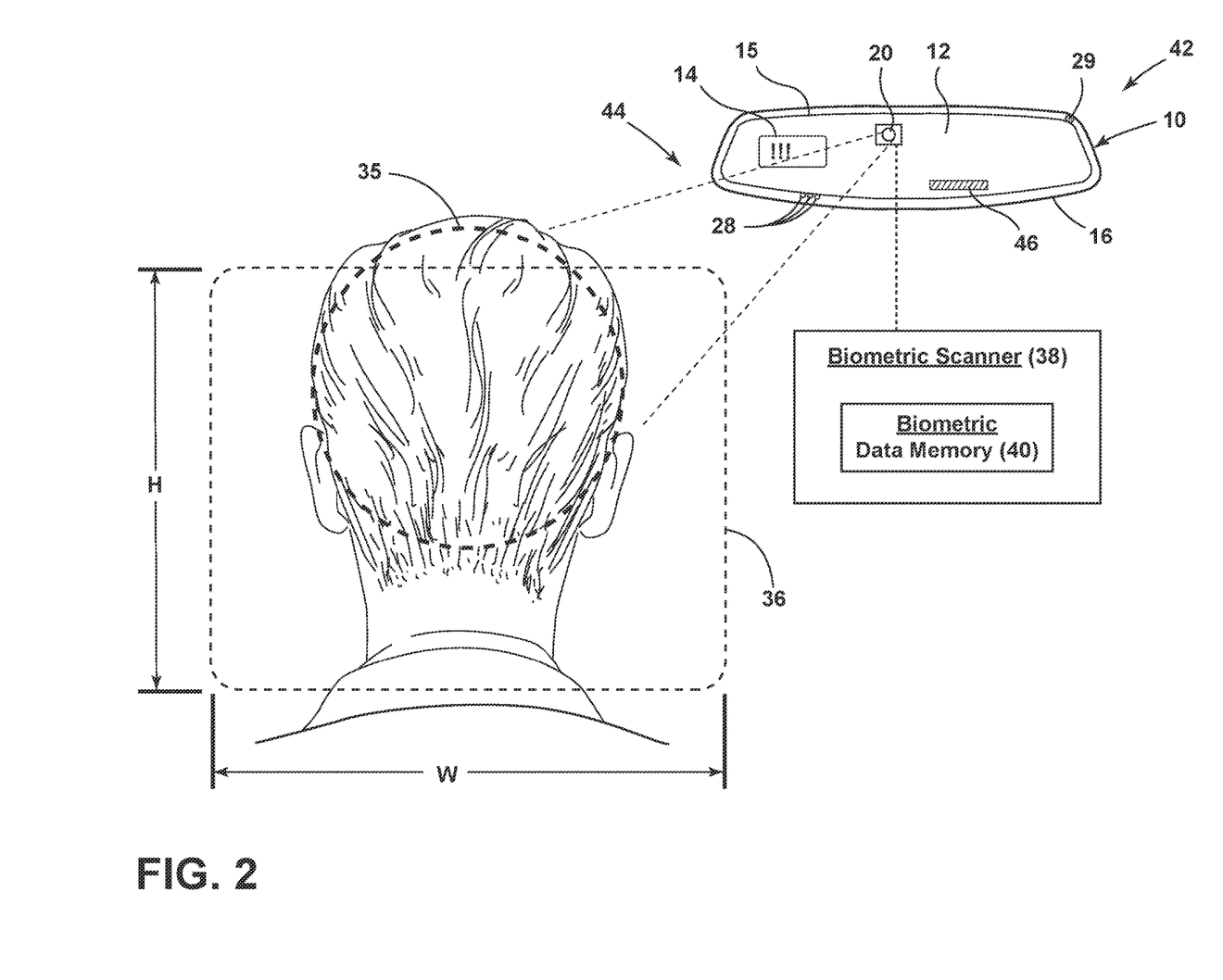
FIG. 2 is a front perspective view of the mirror assembly with a driver modeling system, according to the present disclosure.

Referring initially to FIGS. 1-2, reference numeral 10 generally designates a mirror assembly for a vehicle. In some embodiments, the mirror assembly 10 is a full display mirror that includes a reflective state and a display state. In the reflective state, the mirror assembly 10 operates as a mirror, reflecting light at various wavelengths back towards an intended viewer. In the display state, the mirror assembly 10 relays image data information (e.g., an image, a message, or a recommendation) based on one or more images captured from one or more image capturing components. In accordance with some embodiments, to accomplish this functionality, the mirror assembly 10 includes a partially reflective, partially transmissive element 12 (also referred to as a "glass element" herein) and a display module 14 (FIG. 2) that is viewed through the partially reflective, partially transmissive element 12. The partially reflective, partially transmissive element 12 may be electro-optic, for example, electro-chromic and changes states upon introduction of an applied voltage. As will be described in greater detail below, the mirror assembly 10 includes a driver monitoring functionality. The driver monitoring functionality monitors a driver (e.g., a vehicle operator) and obtains data to determine patterns of the driver's mannerisms. For example, where a driver is looking, a rate of blinking that could indicate tiredness, moving or tilting of the head, etc. Based on these mannerisms, the mirror assembly 10 generates a notification in the event that the driver displays mannerisms coinciding with dangerous operator behaviors (e.g., distraction or drowsiness).

The mirror assembly 10 further includes a housing 16 that shields and supports the partially reflective, partially transmissive element 12 and the display module 14. The housing 16 attaches to an associated vehicle via a mounting member 18. The housing 16 is moveable relative to the mounting member 18 to orient the partially transmissive element 12 at various angles relative to the vehicle operator to obtain different environmental views and/or orientations relative to the vehicle operator.

With reference now particularly to FIG. 1, the mirror assembly 10 further includes a camera unit 20 for capturing image data. As will be appreciated, in some embodiments, the camera unit 20 may be stationary relative to movement of the partially transmissive element 12, the display module 14, and/or the housing 16. In other embodiments, camera unit 20 moves in conjunction with movement of the partially transmissive element 12, the display module 14, and/or the housing 16. More particularly, the camera unit 20 may be directly coupled within the housing 16 to move as the housing 16 is adjusted or the camera unit 20 may be connected to portions of a vehicle that are at least partially outside the housing 16 such that the camera orientation remains unchanged during adjustment of the housing 16. The display module 14 may be sized to substantially extend across an entire viewing area 15 (FIG. 1) or at one or more discrete locations within the viewing area 15 (FIG. 2).

With continued reference to FIG. 1, the mirror assembly 10 is illustrated inside of a cabin 22 of a vehicle. The camera unit 20 may be located on or within the mirror assembly 10 or be located in other portions of the cabin 22. For example, the camera unit 20 may be located on or around an instrument panel 24, a steering wheel 26, or the mounting member 18. The steering wheel 26 may include an airbag 27 with a plurality of settings related to the direction or magnitude of deployment. It should also be appreciated that the camera unit 20 may include a plurality of camera units 20 located in any of the above locations. The camera unit 20 may be a component of a 2D imaging system that further includes at least one illumination element 28 (e.g., a plurality of one, two, three, four, or more illumination elements 28). In some embodiments, the at least one illumination element 28 may include one or more infrared emitters (or near-infrared emitters) for transmitting infrared wavelengths of light. In some embodiments, the camera unit 20 and the at least one illumination element 28 may utilize the same control system (e.g., PCB, ECU, and/or processors) as the other components of the mirror assembly 10. In other embodiments, the camera unit 20 and the at least one illumination element 28 may utilize a different control system than the other components of the mirror assembly 10 and communicate in a wired or wireless manner therewith. The camera unit 20 may include a variety of image-capturing technology, such as night mode, image enhancement, thermal recognition, recording capabilities, wide-angle lenses, and other types of technologies to, for example, capture images in the infrared spectrum.

A driver seat 30 is located in the cabin 22 directly behind the steering wheel 26 and is adjustable in both linear and angular directions. More particularly, the driver seat 30 may be adjustable substantially linearly in a vertical direction (along the axis Y) and a fore-and-aft direction (along the axis Z). The driver seat 30 includes a seat cushion 32, a backrest 34, and a headrest 36 (FIG. 2). The backrest 34 and headrest 36 may be pivoted in the fore-and-aft direction relative to the seat cushion 32 to change an angle that a driver reclines. The position of the driver seat 30 may be saved or otherwise attainable within a control system of the vehicle 31 ("VCS"). In some embodiments, a biometric scanner 38 may be located within the cabin 22 or on an exterior of the vehicle (not shown). For example, the biometric scanner 38 may include one or more of an iris imager or scanner, fingerprint scanner, face imager or scanner, voice scanner/recorder, or various other scanning devices. The biometric scanner 38 obtains scanning data that may be saved in a biometric data memory 40, for example, a local memory or remote cloud server that may be accessible via a wireless communication interface. Thus, the local memory or a remote server can be accessed to search and match scanning data or biometric data to an identification profile to identify a driver and, for example, automatically adjust the driver seat 30 and the housing 16 orientation.

Figure 3:
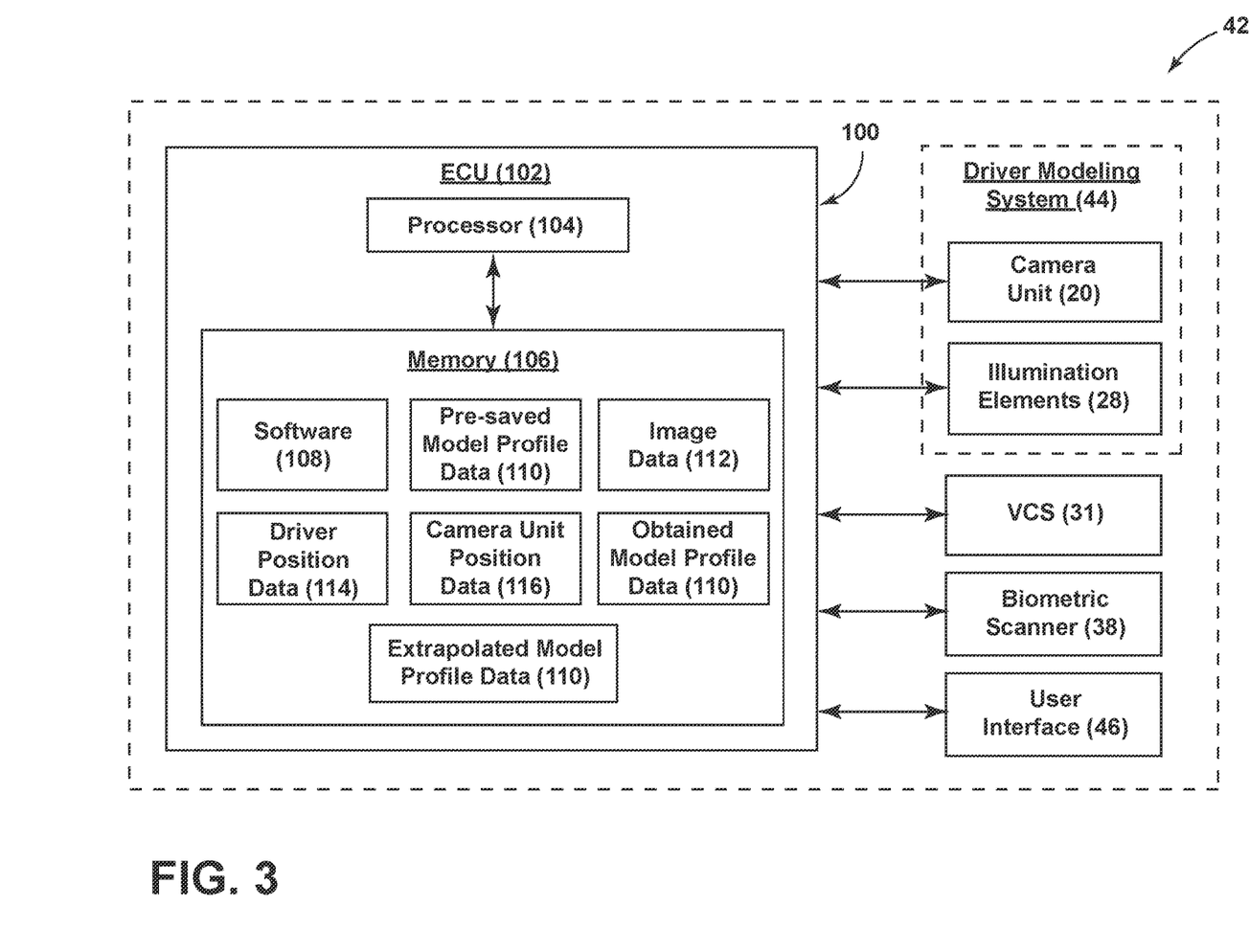
FIG. 3 is a schematic view of a control system of the mirror assembly, according to the present disclosure.

With reference now to FIGS. 2 and 3, the mirror assembly 10 includes a driver monitoring system 42 that provides one or more of the driver monitoring functionalities as discussed above. The driver monitoring system 42 includes a driver modeling system 44. The driver modeling system 44 may, in conjunction with one or more of the camera units 20, the control system of the vehicle 31 (e.g., the seat position), the biometric scanner 38, and the biometric data memory 40, determine a size, shape, and position of a driver to more accurately identify when the driver displays mannerisms coinciding with dangerous operator behaviors. As such, rather than relying on a single driver model to determine driver mannerisms, the driver modeling system 44 may include a plurality of model profiles. Varying sizes, shapes, and positions of drivers can make it difficult to accurately determine mannerisms with the driver monitoring system 42. For example, inaccuracies arise when using a generic head shape for every driver as predetermined variances in head shape (e.g., size, eye locations, etc.) will not be scaled for a particular driver. Selecting a model profile that more accurately represents the physical characteristics of the driver's head can be useful to improve the accuracy of the Driver Monitoring System ("DMS"), including the accuracy with which the location of physical characteristics of the driver (e.g., the eyes), can be determined in 3D space. This can in turn improve the accuracy with which the DMS can determine whether or not a mannerism coincides with dangerous operator behavior, such as by improving the accuracy with which the system can determine whether the driver's gaze is directed toward an area related to the driving task. By improving accuracy, the driver monitoring system 42 provides improved performance and regulatory compliance.

Relative position between a driver and the camera unit 20 can also play an important factor when determining a driver's mannerism, where a tall driver will orient their eyes (e.g., gaze) in different positions from a short driver. Similarly, a driver's size and position may appear different solely based on the positioning of the camera unit 20. For example, when the camera unit 20 is configured to move with the housing 16, movement (e.g., cross-car adjustment, tilting, and/or the like) of the housing 16 affects the orientation and therefore image data captured with the camera unit 20. In some embodiments, the mirror assembly 10 (e.g., the housing 16) includes a position detector 29 and/or includes a control system 100 that can extrapolate the position of the mirror assembly 10 based on image data. More particularly, the camera unit 20 may be a component of a 3D imaging system alternatively to or in addition to 2D imaging. The 3D imaging system may operate under the principles of structured light, stereovision, Light Detection and Ranging ("LIDAR"), RADAR, or any other 3D imaging systems/sensors. In this manner, the control system 100 may be configured to extrapolate 3D information from image data captured by the camera unit 20.

With continued reference to FIGS. 2 and 3, the driver modeling system 44 may be configured to obtain information from a driver based on a number of factors. For example, the driver modeling system 44 may obtain a position of the driver seat 30, wherein the position of the driver seat 30 relative to the vertical direction and the fore-and-aft direction may be associated with a driver's height. The driver's height may be associated with an average head shape (e.g., size, eye location, etc.) for a particular height (e.g., in 1-inch increments, 2-inch increments or less, 4-inch increments or less, or 6-inch increments or less). The driver modeling system 44 may further be configured to obtain reference points from in and around the cabin 22 to better determine a head size, shape, and position (e.g., via a vehicle-based coordinate system). For example, the camera unit 20 may be configured to compare a head size with a width "W" and height "H" of the headrest 36. The W and H of the headrest 36 may be initially saved or may be otherwise determined by extrapolating image data captured by the camera unit 20 to the driver seat 30 location. In some embodiments, the camera unit 20 may be configured to compare a head size with a width of a seatbelt (not shown). The width of the seatbelt may be initially saved or may be otherwise determined by extrapolating image data captured by the camera unit to the driver seat 30 location. The position of the driver's head may also be determined via image data captured by the camera unit 20 and the driver seat 30 position. For example, a vertical head position may be determined by comparing and extrapolating a position of the driver seat 30 with a relative positioning between the head and the headrest 36 and/or the backrest 34. The shape of the head may also be determined via image data captured by the camera unit and relative dimensions of the driver seat 30 position. For example, after determining a head shape (e.g., size, eye location, etc.), vertical and horizontal positioning of a driver's eyes may likewise be determined by profiling physical characteristics of a driver's head, such as a perimeter 35 of the driver's head, chin line, nose, ears, and/or other facial/head features in the image data captured by the camera unit 20. The physical characteristics of the driver's head may be used to assist in determining the driver's gaze. In some embodiments, the eye location, along with other head and/or facial features, is determined independently by the driver monitoring system 42 processing image coordinates that is then compared against the head model to solve for the location and rotation of the actual head in 3D space.

With further reference to FIGS. 2 and 3, the driver modeling system 44 may obtain via detection (e.g., with the position detector 29) and/or extrapolation (e.g., the control system 100) a position of the driver within the vehicle. More particularly, the driver modeling system 44 may initially determine a relative position of the camera unit 20 within the vehicle (e.g., via references points or the position detector 29) and a relative position of the camera relative to the driver (e.g., via reference points or the position detector 29). Once these two relative positions are determined, the control system 100 can determine the position of the driver relative to the vehicle via a coordinate transformation. For example, image data related to the width W and/or height H of the headrest 36 may vary as the camera unit 20 is adjusted. By extrapolating the geometric relationship between the camera unit 20 and the reference points or via the position detector 29, a more accurate representation of a driver's head positioning and size can be obtained. The adjustment process may not be used to directly manipulate the image data, but rather transform DMS outputs (e.g., via coordinate transformation).

In some embodiments, the driver modeling system 44 may request information from the driver, for example, at least one physical characteristic, such as a height classification, a sex classification, a head size and/or the like. This information may be input directly from the driver, e.g., via a user interface 46 on the housing 16, the viewing area 15, a mobile device, or elsewhere within the cabin 22. The user interface 46 may be configured to receive physical inputs (e.g., button presses) or verbal inputs (e.g., from a microphone). For example, the driver modeling system 44 may include a generic height model profile that includes an average head shape (e.g., size, eye location, etc.) for both sexes at sequential changes in height (e.g., every 1-6 inches or less), a male sex height model profile that includes an average head shape for the male sex at sequential changes in height (e.g., every 1-6 inches or less), and a female sex height model profile that includes an average head shape for the female sex at sequential changes in height (e.g., every 1-6 inches or less). The driver modeling system 44 may include model profiles based on sex and not height (e.g., a generic female sex model profile and a generic male sex model profile). As such, if a driver provides height, sex, or both, the driver modeling system 44 may be configured to select the model profile that is most accurate to de-genericize a head size of the driver with as many factors as available (e.g., sex, height, driver seat 30 position, relative sizing with the driver seat 30, steering wheel positioning, etc.). In some embodiments, the driver may be prompted via the user interface 46 to orient their head relative to the camera unit 20 in multiple positions (e.g., facing and side profiles) such that a 3D head shape may be extrapolated (e.g., with the 3D imaging system). In some embodiments, the driver may be prompted, via the user interface 46 to provide other types of physical characteristics, such as head size (e.g., width, length, circumference), a distance between eyes, and/or the like. Each or select of the above described physical characteristics may be used to select or develop an accurate model profile and head position which results in improved accuracy of the DMS system readings and outputs.

The present disclosure may be used with a biometric scanner 38 and authentication system, such as that described in U.S. Pat. No. 10,616,218, which is hereby incorporated herein by reference in its entirety. Further, the present disclosure may be used with a rearview packaging assembly, such as that described in U.S. Pat. Nos. 8,814,373; 8,646, 924; 8,643,931; 8,264,761; and 8,885,240, which are hereby incorporated herein by reference in their entirety.

With reference now to FIG. 3, the control system 100 of the mirror assembly 10 is illustrated. The control system 100 may include an electronic control unit (ECU) 102 configured to perform the functions and method steps as described herein. The ECU 102 may include a processor 104 and a memory 106. The processor 104 may include any suitable processor 104. Additionally, or alternatively, the ECU 102 may include any suitable number of processors, in addition to or other than the processor 104. The memory 106 may comprise a single disk or a plurality of disks (e.g., hard drives), and includes a storage management module that manages one or more partitions within the memory 106. In some embodiments, the memory 106 may include flash memory, semiconductor (solid state) memory, or the like. The memory 106 may include Random Access Memory (RAM), a Read-Only Memory (ROM), or a combination thereof. The memory 106 may include instructions that, when executed by the processor 104, cause the processor 104 to, at least, perform the functions and method steps as described herein. The partially transmissive element 12 and the display module 14, the camera unit 20, the illumination elements 28, the control system of the vehicle 31, the biometric scanner 38, the driver monitoring system 42, and the driver modeling system 44 may therefore be controlled, receive inputs, and/or transmit inputs to and from the ECU 102. The ECU 102 may receive and/or the memory 106 may save software 108, pre-saved model profile data 110 (e.g., relating to height and sex classifications), image data 112, driver position data 114 (e.g., driver seat position and steering wheel position), camera unit position data 116 (e.g., as extrapolated or with the position detector 29), obtained model profile data 118 (e.g., from the user interface 46), and extrapolated model profile data 120.

Figure 4:
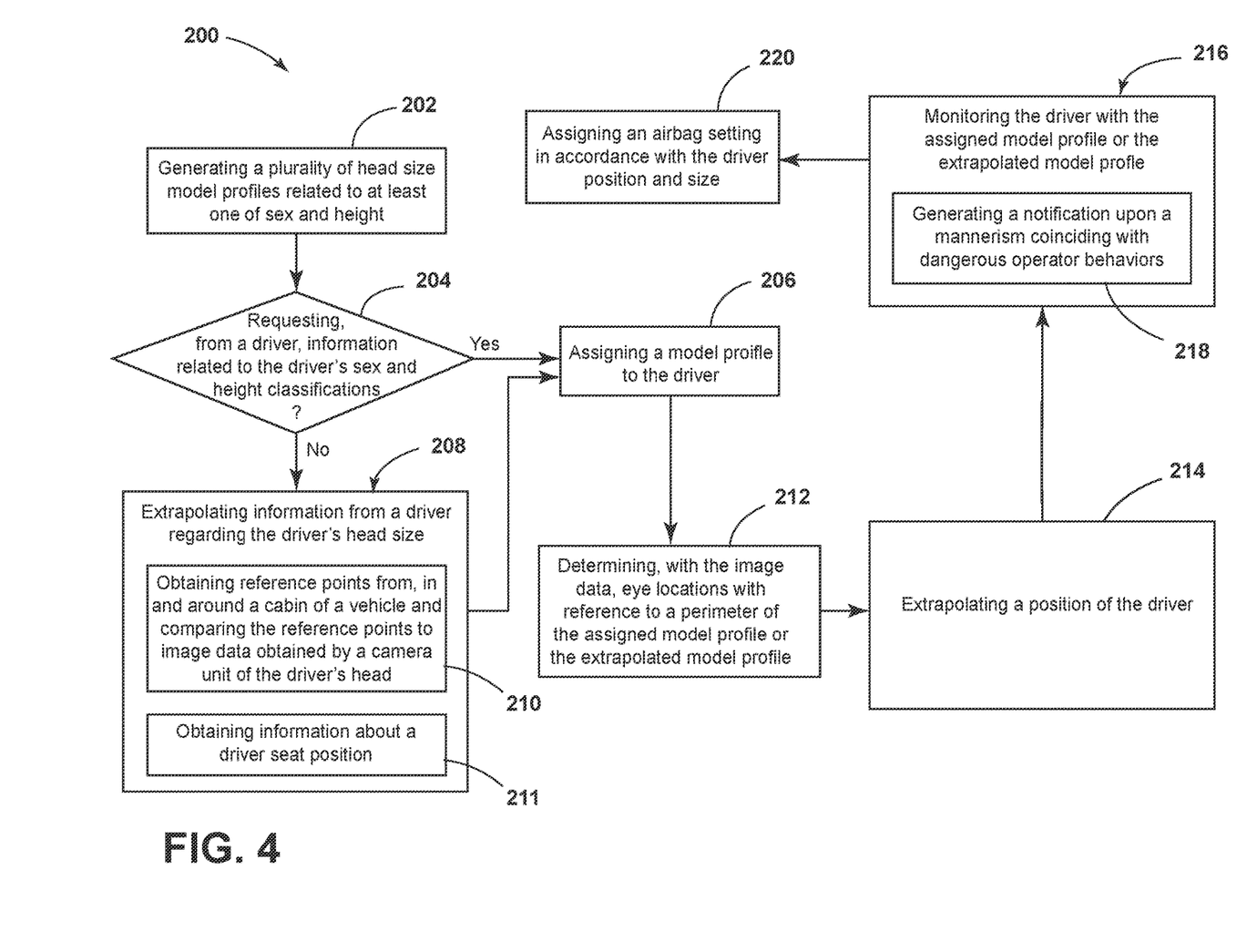
FIG. 4 is a method of modeling a driver for the driver monitoring system, according to the present disclosure.

FIG. 4 illustrates a method 200 of modeling a driver of a vehicle. At 202, the method 200 includes generating a plurality of head shape model profiles related to at least one of sex and height (e.g., head size, eye location, etc.). In some embodiments, the plurality of head shape model profiles related to at least one of sex and height may be pre-generated and tabulated in the memory. Step 202 may include obtaining a position of the camera unit relative to the driver, the camera unit relative to the vehicle, and/or the driver relative to the vehicle to develop a vehicle-based coordinate system (e.g., with the position detector and/or the control system). At 204, the method 200 includes requesting, from a driver, information related to the driver's sex and height classifications (e.g., obtained model profile data 118). At 206, if the driver provides the requested information, the method 200 includes assigning a model profile to the driver (e.g., pre-saved model profile data 110). At 208, if the driver does not provide the requested information, the method 200 includes extrapolating information from a driver regarding the driver's head shape (e.g., extrapolated model profile data 120). Step 208 may include, at 210, obtaining reference points from in and around the cabin and comparing the reference points to image data obtained by a camera unit of the driver's head. Step 208 may further include, at 211, obtaining information about a driver's seat position. After step 208, the method 200 may continue to step 206 where an model profile is assigned (e.g., an extrapolated model profile). From step 206, at 212, the method 200 may include determining, with the image data, eye location, head and/or facial features and comparing the determined features with the assigned model profile or the extrapolated model profile to determine a location and rotation of the head in 3D space. At 214, the method includes extrapolating a position of the driver. At 216, the method 200 may include monitoring the driver with the assigned model profile or the extrapolated model profile. Step 216, at 218, may include generating a notification upon a mannerism coinciding with dangerous operator behaviors. At 220, the method 200 may further include assigning an airbag setting in accordance with the driver position and size.

The invention disclosed herein is further summarized in the following paragraphs and is further characterized by combinations of any and all of the various aspects described therein.

According to one aspect of the present disclosure, a mirror assembly with a driver modeling system for a vehicle is provided. The driver modeling system comprises a camera unit for capturing image data, a user interface, a processor, and a memory. The memory includes instructions that, when executed by the processor, cause the processor to request from a driver on the user interface or extrapolate from the image data at least one physical characteristic. In response to receiving or extrapolating the at least one physical characteristic, assigning one out of a plurality of model profiles of a driver's head based on the at least one physical characteristic.

According to another aspect of the present disclosure, a processor is further configured to obtain information about a position of a driver's seat and extrapolate a position of the driver's head with the driver's seat position and the image data.

According to yet another aspect of the present disclosure, a processor is further configured to obtain reference points from in and around a cabin of the vehicle and extrapolate the position of a driver's head with the reference points and the image data.

According to still another aspect of the present disclosure, a processor is further configured to obtain reference points from in and around a cabin of a vehicle and extrapolate the at least one physical characteristic that includes a size of the driver's head with the reference points and the image data.

According to another aspect of the present disclosure, reference points include a height and a width of a headrest.

According to yet another aspect of the present disclosure, reference points include a width of a seatbelt.

According to still another aspect of the present disclosure, at least one physical characteristic includes a sex or height of the driver.

According to another aspect of the present disclosure, a processor is further configured to compare a size of a driver's head with a height and a width of a headrest.

According to yet another aspect of the present disclosure, a processor is further configured to determine a size of a driver's head by extrapolating 3D information from the image data with a 3D imaging system.

According to still another aspect of the present disclosure, a mirror assembly is configured as a rearview mirror and includes a housing and a mounting member that connects a housing to a vehicle.

According to another aspect of the present disclosure, a mirror assembly includes a partially reflective, partially transmissive element that includes a reflective state and a display state.

According to yet another aspect of the present disclosure, a mirror assembly includes a display for communicating to a driver.

According to still another aspect of the present disclosure, a processor is further configured to monitor a driver with an assigned model profile and generate a notification upon a mannerism coinciding with dangerous operational behaviors.

According to another aspect of the present disclosure, a processor is further configured to adjust an airbag setting based on an assigned model profile.

According to another aspect of the present disclosure, a mirror assembly with a driver modeling system for a vehicle is provided. The driver modeling system comprises a camera unit for capturing image data, a user interface, a processor, and a memory. The memory includes instructions that, when executed by the processor, cause the processor to request, from a driver, at least one physical characteristic via the user interface and, in response to receiving the at least one physical characteristic, assign one out of a plurality of model profiles of a driver's head based on the at least one physical characteristic. The processor is further configured to, in response to not receiving the at least one physical characteristic after a predetermined amount of time, extrapolate a size of the driver's head from the image data and assigning an extrapolated model profile.

According to another aspect of the present disclosure, a processor is further configured to obtain information about a position of a driver's seat and extrapolate a position of the driver's head with the driver's seat position and the image data.

According to another aspect of the present disclosure, a processor is further configured to monitor the driver with at least one of the assigned model profile and the assigned extrapolated model profile and generate a notification upon a mannerism coinciding with dangerous operational behaviors.

According to yet another aspect of the present disclosure, a processor is further configured to adjust an airbag setting based on an assigned model profile or an assigned extrapolated model profile.

According to still another aspect of the present disclosure, a processor is further configured to determine, with the image data, at least one of eye location, head location, and facial features and comparing the determined features with an assigned model profile or an extrapolated model profile to determine a location and rotation of the head in 3D space.

According to yet another aspect of the present disclosure, a mirror assembly with a driver modeling system for a vehicle is provided. The driver modeling system comprises a camera unit for capturing image data, a user interface, a processor, and a memory. The memory includes instructions that, when executed by the processor, cause the processor to request, from a driver, at least one physical characteristic via the user interface and, in response to receiving the at least one physical characteristic, assign one out of a plurality of model profiles of a driver's head based on the at least one physical characteristic. The processor is further configured to obtain a relative position between the camera unit and the vehicle and obtain a relative position between the camera unit and the driver. In response to receiving the relative positions, the processor is further configured to coordinate transform the relative positions to obtain a driver location relative to the vehicle. The processor is further configured to monitor the relative position between the driver and the vehicle with the assigned model profile and generate a notification upon a mannerism coinciding with dangerous operational behaviors.

It will be understood by one having ordinary skill in the art that construction of the described disclosure and other components (unless otherwise stated) is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A mirror assembly with a driver modeling system for a vehicle, the driver modeling system comprising:

a camera unit for capturing image data;
a user interface;
a processor; and
a memory including instructions that, when executed by the processor, cause the processor to:
request from a driver on the user interface one of a height or a sex of the driver, or extrapolate from the image data at least one physical characteristic; and
in response to receiving the height or the sex of the driver, assigning one out of a plurality of model profiles of a driver's head associated with the sex or the height of the driver;
in response to not receiving the height or the sex of the driver, extrapolating the at least one physical characteristic, assigning one out of the plurality of model profiles of the driver's head based on the at least one physical characteristic.

2. The driver modeling system of claim 1, wherein the processor is further configured to:
obtain information about a position of a driver's seat in at least one of a vertical or a fore-and-aft direction with respect to the vehicle; and
extrapolate a position of the driver's head with the driver's seat position and the image data.

3. The driver modeling system of claim 2, wherein the processor is further configured to:
obtain the information about the position of the driver's seat from a control system of the vehicle.

4. The driver modeling system of claim 1, wherein the processor is further configured to:
obtain reference points from in and around a cabin of the vehicle; and
extrapolate the at least one physical characteristic that includes a size of the driver's head with the reference points and the image data.

5. The driver modeling system of claim 4, wherein the reference points include a height and a width of a headrest.

6. The driver modeling system of claim 4, wherein the reference points include a width of a seatbelt.

7. The driver modeling system of claim 1, wherein the model profiles are associated with average head size based on sex and average head size based on incremental increases in height.

8. The driver modeling system of claim 7, wherein the processor is further configured to:
compare the size of the driver's head with a height and a width of a headrest.

9. The driver modeling system of claim 7, wherein the processor is further configured to:
determine the size of the driver's head by extrapolating 3D information from the image data with a 3D imaging system operating under the principles of structured light.

10. The driver modeling system of claim 1, wherein the mirror assembly is configured as a rearview mirror and includes a housing and a mounting member that connects the housing to the vehicle.

11. The driver modeling system of claim 10, wherein the mirror assembly includes a partially reflective, partially transmissive element that includes a reflective state and a display state.

12. The driver modeling system of claim 11, wherein the mirror assembly includes a display for communicating to the driver.

13. The driver modeling system of claim 1, wherein the processor is further configured to:
determine a vertical and horizontal orientation of the driver's eyes; and
monitor the driver with an assigned model profile and generate a notification upon a mannerism of the driver's eyes coinciding with drowsiness or distraction.

14. The driver modeling system of claim 1, wherein the processor is further configured to:
adjust an airbag setting based on the assigned model profile.

15. A mirror assembly with a driver modeling system for a vehicle, the driver modeling system comprising:
a camera unit for capturing image data;
a user interface;
a processor; and
a memory including instructions that, when executed by the processor, cause the processor to:
request, from a driver, at least one physical characteristic via the user interface;
in response to receiving the at least one physical characteristic, assigning one out of a plurality of model profiles of a driver's head based on the at least one physical characteristic; and
in response to not receiving the at least one physical characteristic after a predetermined amount of time, extrapolating a size of the driver's head by comparing the driver's head captured in the image data with one or more reference points in the vehicle and assigning an extrapolated model profile.

16. The driver modeling system of claim 15, wherein the processor is further configured to:
obtain information about a position of a driver's seat; and
extrapolate a position of the driver's head with the driver's seat position and the image data.

17. The driver modeling system of claim 15, wherein the processor is further configured to:
monitor the driver with at least one of the assigned model profile and the assigned extrapolated model profile and generate a notification upon a gaze of the driver being directed to an area unrelated to a driving task.

18. The driver modeling system of claim 17, wherein the processor is further configured to:
adjust an airbag setting based on the assigned model profile or the assigned extrapolated model profile.

19. The driver modeling system of claim 15, wherein the processor is further configured to determine, with the image data, at least one of eye location, head location, and facial features and comparing the determined features with the assigned model profile or the extrapolated model profile to determine a location and rotation of the head in 3D space.

20. A mirror assembly with a driver modeling system for a vehicle, the driver modeling system comprising:
a mounting member;
a housing moveable relative to the mounting member;
a camera unit coupled to and moveable with the housing for capturing image data;
a user interface;
a processor; and
a memory including instructions that, when executed by the processor, cause the processor to:
request from a driver on the user interface or extrapolate from the image data at least one physical characteristic;
in response to receiving or extrapolating the at least one physical characteristic, assigning one out of a plurality of model profiles of a driver's head based on the at least one physical characteristic;

obtain a relative position between the camera unit and the vehicle;
obtain a relative position between the camera unit and the driver;
in response to receiving the relative positions, coordinate transforming the relative positions to obtain a driver location relative to the vehicle; and
monitor the relative position between the driver and the vehicle with the assigned model profile and generate a notification upon a mannerism coinciding with dangerous operational behaviors.

\* \* \* \* \*